United States Patent [19]

Bujes

[11] Patent Number: 4,999,903
[45] Date of Patent: Mar. 19, 1991

[54] PROCESS OF MANUFACTURING COMPOSITE TUBE BY ROLLING AND WELDING WITHOUT ELONGATING THE SAME

[75] Inventor: Georges Bujes, Marly, Switzerland

[73] Assignee: Pabreco S.A., Fribourg, Switzerland

[21] Appl. No.: 332,996

[22] Filed: Apr. 4, 1989

Related U.S. Application Data

[63] Continuation-in-part of Ser. No. 706,522, Feb. 28, 1985, abandoned.

[30] Foreign Application Priority Data

Mar. 16, 1984 [CH] Switzerland .................. 1342/84

[51] Int. Cl.$^5$ ............................................ B21D 35/00
[52] U.S. Cl. ...................... 29/469.5; 29/517;
29/DIG. 11; 29/DIG. 32; 29/DIG. 48;
138/151; 228/156
[58] Field of Search ............... 29/458, 460, 469.5,
29/429, 517, DIG. 11, DIG. 32, DIG. 47,
DIG. 48; 285/55; 138/140, 143, 151; 228/148,
147, 156, 159; 72/206, 274

[56] References Cited

U.S. PATENT DOCUMENTS

| | | | |
|---|---|---|---|
| 1,794,902 | 1/1929 | Johnson | 29/517 X |
| 2,697,772 | 5/1952 | Kinghorn | 228/148 X |
| 3,069,763 | 12/1962 | Reynolds | 228/147 X |
| 3,639,970 | 2/1972 | Larkin | 285/55 X |
| 4,289,172 | 9/1981 | Ekstrom | 138/140 X |
| 4,503,602 | 3/1985 | Hillmann | 29/517 X |

FOREIGN PATENT DOCUMENTS

| | | |
|---|---|---|
| 633623 | 12/1961 | Canada ................ 228/148 |
| 0024220 | 2/1981 | European Pat. Off. . |
| 67919 | 12/1982 | European Pat. Off. . |
| 2923544 | 12/1980 | Fed. Rep. of Germany . |

Primary Examiner—Joseph M. Gorski
Assistant Examiner—Peter Dungba Vo
Attorney, Agent, or Firm—Sandler, Greenblum & Bernstein

[57] ABSTRACT

A process for producing multi-layer composite tubes involves extruding an inner plastic tube prior to forming a metallic tube around the inner plastic tube which is subsequently covered with an outer plastic layer. The metallic tube is initially formed to have an inner diameter which is substantially greater than the outer diameter of the inner plastic tube. Subsequent to welding to seal the metallic sheet into the form of a tube, the excess diameter of the metallic tube is reduced in a manner which avoids stretching or elongating the tube. Adhesive coatings can be applied between the various constituent layers of tubes, and a mesh can be interposed between the metallic tube and the outer plastic layer.

58 Claims, 2 Drawing Sheets

PROCESS OF MANUFACTURING COMPOSITE TUBE BY ROLLING AND WELDING WITHOUT ELONGATING THE SAME

This is a Continuation-In-Part of application Ser. No. 06/706,522, filed Feb. 28, 1985 now abandoned.

BACKGROUND OF THE INVENTION

1. Field of the invention

The present invention relates to a process and apparatus for the production of composite tubes. In particular, the present invention is directed to a process for the production of a composite tube including layers of plastic, metal and plastic. Specifically, the process and the apparatus of the present invention are directed to the production of an inner plastic tube, covered by a metal tube which is treated so as to reduce its diameter without causing the tube to elongate, followed by covering the metal tube with a layer of plastic.

2. Description of Background and Relevant Information

Composite tubes, made from concentrically disposed plastic metal and plastic tubes are generally available.

A German publication, DE 2 923 544, describes a process in which an intermediate layer of plastic material is coextruded onto an inner tube, made from plastic, followed by covering the multi-layer plastic tube with a metallic tube. The metallic tube, however, is subjected to a stretching and elongation operation.

A European publication, EP 0 024 220, describes a process in which two layers of plastic material are extruded within a metallic tube.

The previously described patent specifications are directed to processes which have attempted to solve the problem of producing tubes composed of two internal plastic layers located within an exterior metallic tube.

Another example of a conventional composite tube is described in EP 0 067 919.

In contrast, the process and apparatus of the present invention is directed to a solution to problems associated with the production of reinforced composite tubes having a metallic core which is concealed within plastic material. A composite tube in accordance with the present invention wherein an intermediate metallic tube is positioned between an inner and an outer plastic tube provides a tubular construction which ensures the requisite rigidity or semi-rigidity without the metal being exposed to the elements so as to minimize deterioration as a result of corrosion or damage by being subjected to external stresses.

SUMMARY OF THE INVENTION

An object of the present invention is to provide a process for the production of multi-layer composite tubes including a metal tube component by a method wherein stretching or elongation of the metal tube is avoided which involves providing a first tube with a predetermined outer diameter defined by an outer surface of the tube; forming a metal tube, with an inner surface to surround the first tube, having an inner diameter sufficiently greater than the predetermined outer diameter so that space exists between the outer surface of the first tube and the inner surface of the metal tube around at least a portion of the first tube; and reducing the inner diameter of the metal tube so that the inner surface of the metal tube contacts the outer surface of the first tube so as to produce a multi-layer composite tube without stretching or elongating the metal tube.

Another object of the present invention is to provide a process for the production of multi-layer composite tubes, as described above, wherein forming the metal tube is performed by wrapping a sheet of metallic material having longitudinal edges around the first tube to butt the edges together, and sealing the edges to form a seam, preferably wherein the inner diameter of the metal tube is 0.5 to 5% greater than the outer diameter of the first tube, and the space exists around a portion of the first tube adjacent the seam, preferably wherein the sealing involves welding the edges together by a technique selected from the group consisting of laser welding and plasma welding, and preferably wherein the welding is plasma welding in an inert atmosphere.

A further object of the present invention is to provide a process for the production of a multi-layer composite tube, as described above, wherein the metallic material is composed of a metal, such as aluminum or aluminum alloys, capable of withstanding calibration procedures without stretching or elongating.

A still further object of the present invention is to provide a process for the production of a multi-layer composite tube, as described above, wherein providing a first tube involves extruding a plastic material to shape the tube, wherein the plastic material is a member selected from the group consisting of polyolefins and polyamides, preferably wherein said plastic material is polyethylene, a fluorinated plastic material, or an elastomer.

A still further object of the present invention is to provide a process for the production of a multi-layer composite tube, as described above, which involves coating the first tube with an adhesive to provide a coated inner tube, wherein the adhesive is a member selected from the group consisting of ionomers and modified polyethylene, and preferably EVA polyethylene, wherein the process also involves heating the coated inner tube to activate the adhesive by subjecting the coated inner tube to high frequency radiation.

It is another object of the present invention to provide a process for the production of multi-layer composite tubes, as described above, which also involves covering the outer surface of the metal tube with plastic material, including a layer of plastic selected from the group consisting of polyolefins and polyamides, preferably wherein the layer of plastic is polyethylene, or a fluorinated plastic material, and wherein the plastic material includes a coating of adhesive applied to the outer surface of the metal tube, preferably wherein the adhesive is a plastic material selected from the group consisting of ionomers and modified polyethylene, and preferably EVA polyethylene.

It is yet another object of the present invention to provide a method for the production of a multi-layer composite tube, as described above, wherein the plastic material includes an underlayer of mesh disposed between the outer layer of the metal tube and the layer of plastic material, wherein the mesh is composed of plastic material selected from the group consisting of polyesters and polyamides, and preferably a polyester, and also involves applying at least one mesh layer over the outer surface of the metal tube before covering the tube with the layer of plastic, wherein the mesh layer is composed of a material selected from the group consisting of textiles and metallic substance, and preferably metallic mesh, which is preferably applied in successive metallic mesh layers over the outer surface of the metal tube in an atmosphere under pressures greater than 300 bars.

BRIEF DESCRIPTION OF THE DRAWINGS

The foregoing and other objects of the invention will become apparent upon a consideration of the following specification and appended claims taken in conjunction with the accompanying drawings, in which:

DETAILED DESCRIPTION

Figure 1:
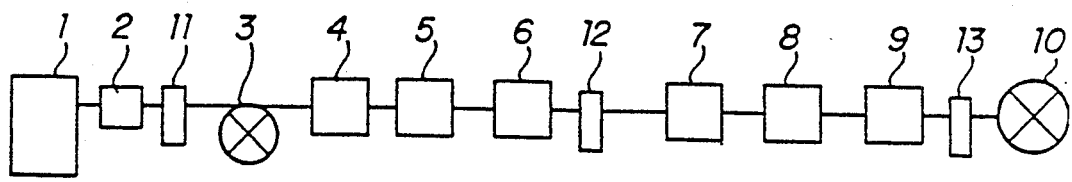
FIG. 1 is a schematic illustration of the production line in accordance with the present invention.

In general, the process according to the present invention produces a multi-layer composite tube composed of an inner plastic tube, an intermediate metal tube, and an exterior plastic tube. The multi-layer composite tube in accordance with the present invention is produced by extruding an inner plastic material into a tubular configuration, followed by forming a metallic tube around the inner plastic tube, followed by covering the metallic tube with an outer layer of plastic material.

A significant feature of the present invention is that the metallic tube is initially formed to have an inner diameter which is substantially greater than the outer diameter of the inner plastic tube. This is particularly advantageous when the metallic tube is formed from a sheet of metal material which is folded around the inner plastic tube to form a metal tube by butting the longitudinal edges of the sheet together. Thus, the excess diameter of the metallic tube is advantageous at this stage of the production when the longitudinal edges of the metallic sheet are sealed by butt welding. Otherwise, localized heating of the seam as a result of the welding would scorch or burn the inner plastic tube if the intermediate metal tube were in contact with the inner plastic tube, particularly along the seam line. Subsequently, the excess diameter of the metallic tube is then reduced by a calibration operation carried out in such a manner that stretching and elongating the metallic tube is avoided.

As used herein, the expression "a substantially greater diameter" should be understood as designating a value of from 0.5 to 5%, so that when the diameter of the metallic tube is reduced, it can definitively adhere to the inner plastic tube.

The metallic tube is preferably sealed by butting the longitudinal edges of the metallic sheet from which it is formed, edge-to-edge, without any covering or overlapping, preferably by plasma welding under gas shielding, preferably performed in an inert atmosphere, such as nitrogen or helium. The metallic tube can also be sealed by laser welding. As previously mentioned, the excess diameter of the metallic tube, with respect to the diameter of the inner plastic tube, is calculated so that the metallic tube does not contact the inner plastic tube, at least at, the level of the edges where the weld is to be made. Otherwise, a weld line will form along the exterior surface of the inner plastic tube as a result of heating or scorching, which is to be avoided at all costs. Otherwise, the inner plastic tube becomes weakened as a result of the weld line and may be prone to cracking or developing holes along the weld line. Thus, providing a space between the inner plastic tube and the intermediate metal tube at least along the area of the weld line, prevents the transmission of heat perpendicularly, i.e., towards the inner plastic tube, while at the same time ensuring the even dissipation and distribution of heat throughout the entire mass of the metallic tube to minimize localized hot spots.

After the weld has been made, the metallic tube is then subjected to the calibration operation in accordance with the present invention which has the effect of reducing the diameter of the metallic tube so that the metallic tube contacts the inner plastic tube.

Subsequently, an outer plastic layer is formed around the intermediate metallic tube.

Optionally, coatings of various materials may be interposed between the tubes of the multi-layer composite tube structure. In this regard, an adhesive coating can be inserted between the inner plastic tube and the intermediate metallic tube, and/or between the intermediate metallic tube and the outer plastic layer, respectively, particularly if the plastic materials used do not have properties of self-adhesion to the metal. In addition, a woven or non-woven mesh, for example a textile mesh, may advantageously be inserted between the metallic tube and the outer plastic layer. Inasmuch as the adhesive materials used for these various coatings are preferably heat-activated, it is important to heat the entire composite tube by, for example, application of high frequencies in order to activate the adhesive material.

The inner tube may be formed from numerous plastic materials, such as fluorinated plastic materials, elastomers or other materials which are compatible with the production process in accordance with the present invention, and preferably may be selected from the group consisting of polyolefins and fluorinated plastic material.

The outer plastic layer may be formed from essentially the same materials described as being suitable for purposes of the inner plastic tube. To reiterate, the plastic material which may be used for the outer plastic layer includes fluorinated plastic material, elastomers and other materials which are compatible with the production process in accordance with the present invention and preferably are selected from the group consisting of polyolefins and polyamides.

The metallic tube may be formed from aluminum or an aluminum alloy, or any other material capable, depending upon its thickness, of being calibrated in accordance with the present invention without becoming stretched or elongated.

The adhesive used in accordance with the present invention may be selected depending upon the composition of the particular components to which it is applied. In this regard, preferred adhesives to be applied to polyolefins include an ionomer, an EVA or a polyethylene, which has been modified to meet the desired heat-resistance criteria.

The previously mentioned mesh may be of a textile or metallic nature, but should be selected to meet the desired pressure resistance criteria of the tube. Accordingly, a mesh of stabilized polyester or polyamide type is preferred for reasons of health and safety. The use of a metallic tube, which may be applied in successive layers, is preferably reserved for hot-pressure applications above 300 bars.

The selection of constituent materials is dependent upon the intended use of the multi-layer composite tube. In this regard, the composite tubes are selected, particularly with respect to rigidity or semi-rigidity, mechanical resistance, resistance to pressure and resistance to external corrosion, dependent both upon the nature of fluid to be transported therethrough as well as the use to be made of the composite tube.

With specific reference to the drawings, the process for producing multi-layer composite tubes in accordance with the present invention is performed in a continuous production unit including an extruder 1, provided at the beginning of the production line for forming the inner plastic tube 100 to meet requisite dimensional criteria. An adhesive coating 200 is applied by a transverse extruder head 2 fed by an extruder. Alternatively, the inner plastic tube and the adhesive coating can be simultaneously coextruded in a single operation by means of two extruders supplying a common head.

A metallic sheet 300 is then formed around the inner plastic tube to form an intermediate metallic tube. Prior to shaping, however, grease and other undesirable residues should be thoroughly removed from the metallic sheet 300 before shaping. In addition, the metallic sheet should be treated on both of its surface sides by oxidation processes, preferably by thermal or electrical means, thereby creating surface layers of molecular or polymolecular thickness. As shown in the drawings, the metallic sheet 300 which has been treated to remove grease and other residues, is adapted to receive with precision the plastic tube 100 which has preferably been coated with an adhesive 200 prior to being passed into a shaping station 4, where it is shaped so as to create a tube 300 in a manner which avoids overlapping the edges of the metallic sheet. As indicated above, this metallic tube 300 has an inner diameter which is slightly greater than the outer diameter of the inner plastic tube 100 which is shown as being positioned eccentrically within the metallic tube 300. Thus, the metallic tube 300 initially only contacts the plastic tube along a section opposite the weld line connecting the longitudinal edges of the metallic sheet together in the form of the tube. The welding is preferably accomplished using a butt welding technique preferably by plasma welding (40) in an inert atmosphere, preferably of helium or nitrogen in station 5.

The multi-layer plastic and metallic tube composite which has thus been formed is then passed into the calibration station 6 which is provided in accordance with the present invention with motorized rollers for the purpose of causing the metallic tube 300, preferably made from aluminum, to contact the inner plastic tube over its entire surface.

Figure 5:
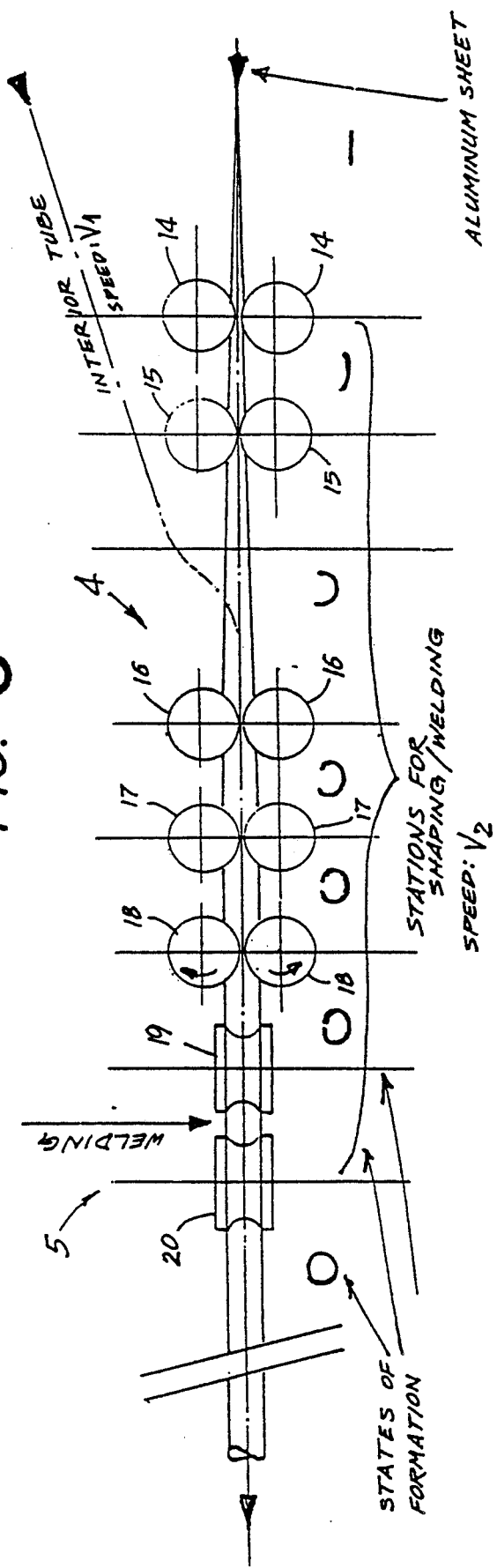
FIG. 5 illustrates another view of the production line, including various sets of rollers and driving elements for moving and shaping the tube therealong.
Figure 5:
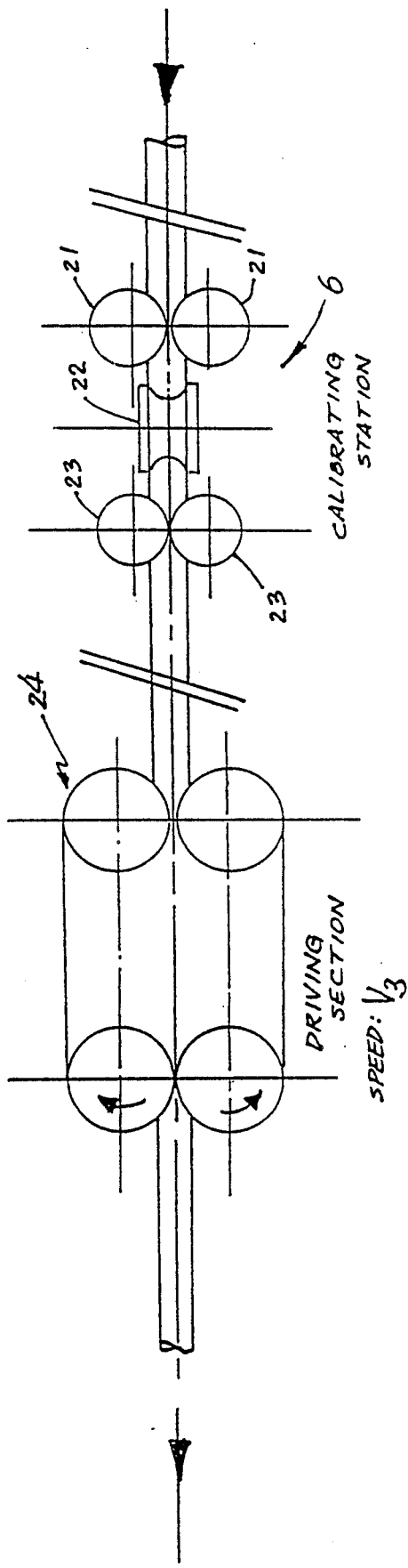

FIG. 5 illustrates a further view of the production line of the present invention, specifically identifying the means by which the metallic tube 300, preferably made from aluminum or an alloy thereof, is formed into a tubular shape surrounding the inner plastic tube 100 and then is shaped to be placed in contact with the inner plastic tube. As explained below, the forming and shaping of the metallic tube is made possible by, on the one hand, the excellent formability, or malleability, of the aluminum or aluminum alloy material, e.g., from which the tube is made, and, on the other hand, by the use of groupings of appropriately spaced sets of power driven rollers along the production line, whose speed is controlled and synchronized in relation to one another.

As schematically shown in FIG. 5, and as previously described, the interior tube 100 is first fabricated, preferably by extrusion, and is advanced at a velocity $V_1$. The metallic material, in the form of a sheet, is then formed around the interior plastic tube. The forming and guiding of the metallic sheet is accomplished by groups of driven rollers. Approximately six to ten pairs of rollers can be used. Roller pairs 14 and 15 are shown as guiding the metallic sheet toward the shaping station 4, at which point the substantially planar sheet is formed into its tubular shape as described above. As shown in FIG. 5, roller pairs 16, 17, and 18 generally progressively form the sheet into its tubular shape. As further shown, roller pairs 19 and 20, which are oriented on axes generally perpendicular to the axes of roller pairs 16, 17, and 18, complete the shaping of the tube 300 prior to the step of welding as previously described. Rollers 16, 17, 18, e.g., can be positioned along generally horizontal axes, whereas rollers 19 and 20 would then be positioned along generally vertical axes.

FIG. 5 schematically illustrates the various progressive states of formation of the metallic tube 300 as it moves through roller pairs 14 to 20. At the point of rollers 19 and 20, the butting of the sides of the metallic sheet is accomplished, at which point the thus created seam is welded, as described above. As shown in FIG. 5, shaping and welding of the tube is accomplished while driving roller sets 14 to 20 at a velocity $V_2$.

The shaped and welded tube 300 acquires, and as supported by the interior tube 100, a certain rigidity in considerable bending and, as a result, can support substantial axial and radial forces without deformation so long as the support points are not spaced too far apart.

After the shaping and welding of the metallic tube is the calibrating, or sizing station 6. This station can include three or four pairs of rollers, three pairs 21, 22, 23 being illustrated in FIG. 5. These roller pairs are arranged along alternately perpendicular axes and are preferably not directly driven. By the action of the various rollers applying respective forces transversely against the tube 300, a decrease in the diameter of the tube 300 is obtained whereby the tube is pressed closely against the interior plastic tube 100. As mentioned above, the malleability of the metallic material, aluminum or aluminum alloy, for example, facilitates this shaping or sizing of the tube.

Following the sizing or shaping station 6 is a further driving section 24 for the tube. This driving section as shown in FIG. 5 can take the form of an opposed pair of endless driving belts which are trained around respective rollers to thereby surround the metallic tube for driving it along the production line at a velocity $V_3$.

The extrusion of the plastic tube is done so that its introduction into the metallic tube, which is in the process of being formed, is effected without pushing or pulling. To do this, a control portion representing a certain compensatory length is arranged before the forming or shaping stage of the metallic tube. Velocities $V_2$ and $v_3$ can be independently controlled to develop between the shaping/welding stage and the driving section 24 a pushing, a pulling, or a neutral component with respect to the advancement of the tube. The peripheral speeds of the rollers and the driving section 24 are easily controllable and regulatable. For example, by adjusting the speeds such that $v_3$ is greater than $V_2$, a lengthening of the tube can be obtained. On the other hand, by adjusting the speeds such that $V_2$ is greater than $V_3$, a shortening of the tube can be obtained Although the lengthening or shortening effects that are possible by regulating the aforementioned speeds are somewhat limited, they are, however, sufficient for the production of the present invention and for the end sought. For example, by maintaining the respective velocities of the rollers and the driving section 24 relatively equal, and in view of the malleability of the metallic material used, the metallic tube 300, once formed and welded, can be compressed against the interior tube 100 by means of rollers 21-23, e.g., without lengthening of the tube.

The resultant tube which has been formed in accordance with the previously described procedure is then subjected to heat, preferably by being passed over a high frequency coil, so as to activate adhesives which may be present within the multi-layer composite tube structure.

At the following station and, depending on the treatments which have been previously carried out on the aluminum before shaping, the surface temperature of the aluminum tube may again be raised by, for example, flame-treatment, by passing the outer surface of the aluminum tube through a bank of burners. Alternatively, the flame-treatment may be performed before high frequencies are applied.

In the following stage, an adhesive coating 700 is applied in station 7 as generally described above, followed by covering with a mesh 800, preferably of the polyester type at station 8.

The outer plastic layer 900 is then applied at station 9. As previously mentioned, the outer plastic layer is preferably made from polyethylene or cross-linked polyethylene.

The previously described stations are diagrammatically shown in FIG. 1 which also shows a metallic tape drive 3, preferably for aluminum, a winding device 10 for winding the finished tube, and control devices 11, 12 and 13, respectively, for controlling the dimensions, the weld and the dimensions and surface of the finished tube.

Figure 2:
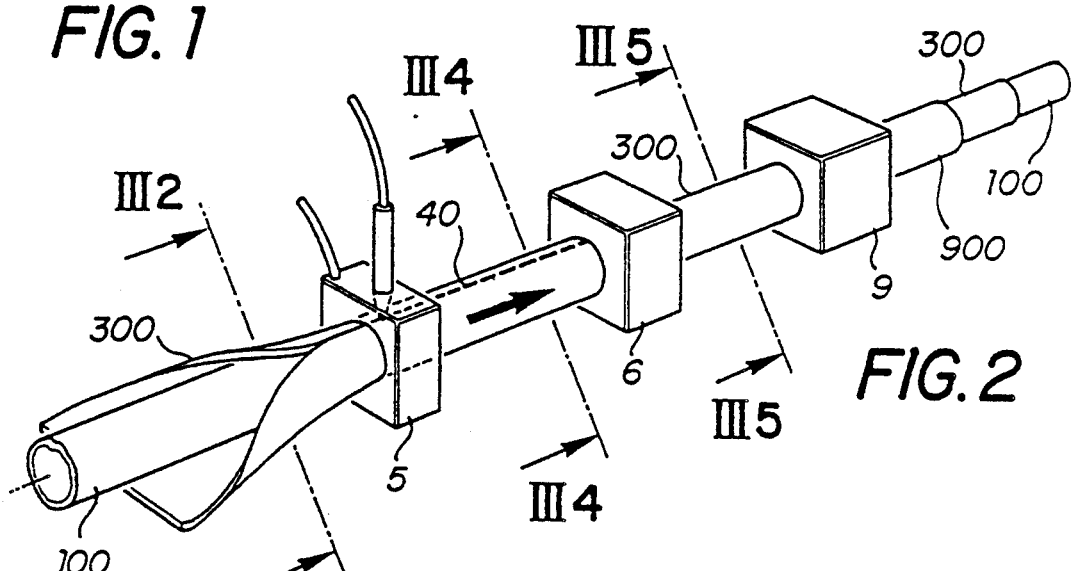
FIG. 2 is a simplified perspective view of the production line for producing the tube in accordance with the present invention.
Figure 3:
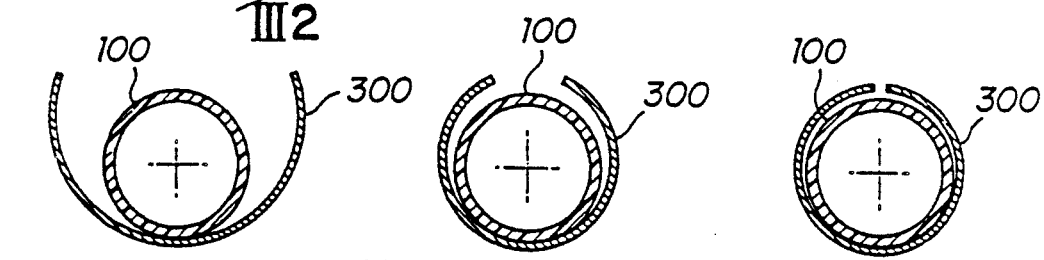
FIG. 3 illustrates axial sections of the tube at different stages of production.
Figure 4:
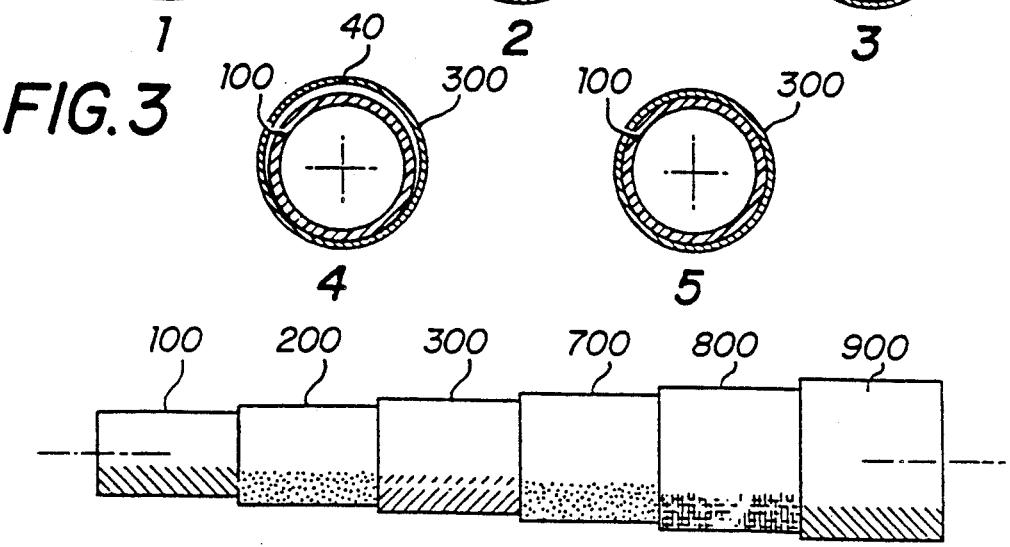
FIG. 4 illustrates a "peeled" view of the finished tube showing the various layers of the composite tube.

Turning now to FIG. 3, the sequence of shaping the metallic tube 300 around the inner plastic tube 100 is further illustrated. In this regard, FIGS. 3-1 to 3-3 show the shaping of the metallic sheet around the inner plastic tube. For example, FIG. 3-2 illustrates a cross-section of the tube at section III 2 of FIG. 2. Similarly, FIG. 3-4 is a section along III 4, and FIG. 3-5 is a section along III 5 of FIG. 2.

Once the resulting tube is sized, or calibrated, it is then subjected to an operation to receive the outer layer 900 after the adhesive coating 700 and mesh layer 800 have been applied.

In accordance with the previously described procedure, a multi-layer construction including plastic, metal and plastic tubes forming a composite tube in accordance with the present invention is thus obtained which has all of the advantages of light weight, solidity, shapability and resistance to corrosion that one normally expects from composite tubes of such materials. More particularly, composite tubes produced in accordance with the present invention combines the qualities of its metal and plastic components, while avoiding the more serious disadvantages if only one or the other of such materials were used in the formation of a tube.

The composite tubes produced in accordance with the present invention are particularly suitable for use in transporting cold and hot fluids, optionally under pressure, including volatile fluids, and explosive gases and the like. The composite tube of the present invention has also been found to be particularly advantageous when used for heating systems, particularly solar heating systems.

It should also be noted that the tube can be deformed manually or by means of a bending press, depending upon its diameter or the rigidity of its components. In any event, the composite tube of the present invention maintains its given shape, for example a curved shape.

From the foregoing description, one skilled in the art can easily ascertain the essential characteristics of this invention and, without departing from the spirit and scope thereof, make various changes and modifications of the inventions to adapt to various usages and conditions.

What is claimed is:

1. A process for producing multi-layer composite tubes including a metal tube component by a method wherein elongation of the metal tube is avoided, comprising the steps of:
    (a) providing a first tube with a predetermined outer diameter defined by an outer surface of the tube;
    (b) forming a metal tube with an inner surface surrounding said first tube with said metal tube, said metal tube having an inner diameter sufficiently greater than said predetermined outer diameter so that space exists between said outer surface of the first tube and said inner surface of the metal tube around at least a portion of said first tube; and
    (c) reducing said inner diameter of said metal tube so that said inner surface of said metal tube contacts said outer surface of the first tube by applying a force against said metal tube without elongating said metal tube.

2. The process in accordance with claim 1, wherein said forming a metal tube comprises wrapping a sheet of metallic material having longitudinal edges around the first tube and butting said edges together, and sealing said edges thereby forming a seam.

3. The process in accordance with claim 2, wherein said metallic material is composed of a metal capable of withstanding calibration procedures without elongating.

4. The process in accordance with claim 3, wherein said metallic material is selected from the group consisting of aluminum and aluminum alloys.

5. The process in accordance with claim 2, wherein said inner diameter of the metal tube is 0.5 to 5% greater than said outer diameter of the first tube.

6. The process in accordance with claim 5, wherein said space exists around a portion of the first tube adjacent said seam.

7. The process in accordance with claim 6, wherein said sealing involves welding said edges together.

8. The process in accordance with claim 7, wherein said welding is a technique selected from the group consisting of laser welding and plasma welding.

9. The process in accordance with claim 8, wherein said welding is plasma welding in an inert atmosphere.

10. The process in accordance with claim 5, wherein said providing a first tube comprises extruding a plastic material tube.

11. The process in accordance with claim 10, wherein said plastic material is a member selected from the group consisting of polyolefins and polyamides.

12. The process in accordance with claim 11, wherein said plastic material is polyethylene.

13. The process in accordance with claim 10, wherein said plastic material is fluorinated plastic material 14. The process in accordance with claim 10, wherein said plastic material is an elastomer.

15. The process in accordance with claim 5, comprising coating said first tube with an adhesive thereby providing a coated inner tube.

16. The process in accordance with claim 15, wherein said adhesive is a member selected from the group consisting of ionomers and modified polyethylene.

17. The process in accordance with claim 16, wherein said adhesive is EVA polyethylene.

18. The process in accordance with claim 15, comprising heating said coated inner tube, thereby activating to activate said adhesive.

19. The process in accordance with claim 18, wherein said heating involves subjecting said coated inner tube to high frequency radiation.

20. The process in accordance with claim 5, comprising covering an outer surface of the metal tube with plastic material.

21. The process in accordance with claim 20, wherein said plastic material includes a layer of plastic selected from the group consisting of polyolefins and polyamides.

22. The process in accordance with claim 21, wherein said layer of plastic is polyethylene.

23. The process in accordance with claim 21, wherein said layer of plastic is a fluorinated plastic material.

24. The process in accordance with claim 21, wherein said plastic material includes a coating of adhesive applied to said outer surface of the metal tube.

25. The process in accordance with claim 24, wherein said adhesive is a plastic material selected from the group consisting of ionomers and modified polyethylene.

26. The process in accordance with claim 25, wherein said adhesive is EVA polyethylene.

27. The process in accordance with claim 21, wherein said plastic material includes an underlayer of mesh disposed between said outer surface of the metal tube and said layer of plastic material.

28. The process in accordance with claim 27, wherein said mesh is composed of plastic material selected from the group consisting of polyesters and polyamides.

29. The process in accordance with claim 28, wherein said mesh is composed of polyester.

30. The process in accordance with claim 21, comprising applying at least one mesh layer over said outer surface of the metal tube before covering said metal tube with said layer of plastic.

31. The process in accordance with claim 30, wherein said mesh layer is composed of a material selected from the group consisting of textiles and metallic substance.

32. The process in accordance with claim 31, wherein said mesh is metallic mesh

33. The process in accordance with claim 32, comprising applying successive metallic mesh layers over said outer surface of the metal tube in an atmosphere under pressures greater than 300 bars.

34. The process in accordance with claim 1, wherein said step of reducing said inner diameter of said metal tube is accomplished by pressing said metal tube against said first tube.

35. The process in accordance with claim 34, wherein said pressing of said metal tube against said first tube is performed by utilizing a plurality of pairs of rollers positioned along said metal tube.

36. The process in accordance with claim 1, including advancing said metal tube along a production line by utilizing plurality of driving elements positioned along said production line.

37. The process in accordance with claim 36, including performing wherein said step of reducing said inner diameter of said metal tube at a sizing station and wherein said plurality of driving elements comprises a first plurality of driving elements positioned upstream of said sizing station and at least one further driving element positioned downstream of said sizing station.

38. A process for producing multi-layer composite tubes including a metal component by a method in which the metal tube is shaped at a sizing station, the method comprising the steps of:
  (a) providing a first tube with a predetermined outer diameter defined by an outer surface of the tube;
  (b) forming a metal tube with an inner surface surrounding said first tube with said metal tube said metal tube having an inner diameter sufficiently greater than said predetermined outer diameter so that space exists between said outer surface of the first tube and said inner surface of the metal tube around at least a portion of said first tube;
  (c) advancing said metal tube along a production line by utilizing a first plurality of driving elements positioned upstream of the sizing station and at least one further driving element positioned downstream of the sizing station, by driving said first plurality of driving elements at a first velocity and said at least one further driving element at a second velocity, wherein said second velocity is no greater than said first velocity, thereby driving said metal tube in accordance with said velocities; and
  (d) pressing said metal tube at the sizing station so that said inner surface of said metal tube contacts said outer surface of the first tube without elongation of said metal tube.

39. The process in accordance with claim 38, wherein said second velocity is substantially the same as said first velocity.

40. The process in accordance with claim 38, wherein said step of forming a metal tube comprises forming said metal tube from a sheet of metal, while advancing said sheet of metal along said production line, by utilizing rollers positioned along said production line.

41. The process in accordance with claim 40, wherein said rollers are comprised at least by said first plurality of driving elements.

42. The process in accordance with claim 40, wherein said sheet of metal has longitudinal edges and wherein said step of forming said metal tube from a sheet of metal comprises folding said longitudinal edges around said first tube and bringing said longitudinal edges together without overlapping said longitudinal edges, and sealing said longitudinal edges together thereby forming a seam.

43. The process in accordance with claim 42, wherein said seam is formed by welding.

44. The process in accordance with claim 43, including in said step of forming said metal tube, creating said space adjacent said seam.

45. The process in accordance with claim 43, further comprising, prior to said step of welding, the step of affixing an adhesive to said first tube.

46. The process in accordance with claim 38, wherein the metal from which said metal tube is formed is selected from the group consisting of aluminum and aluminum alloys.

47. The process in accordance with claim 38, wherein said step of providing a first tube comprises providing a first tube made of a plastic material.

48. The process in accordance with claim 47, wherein said plastic material is selected from the group consisting of polyolefins and polyamides.

49. The process in accordance with claim 47, wherein said plastic material is polyethylene.

50. The process in accordance with claim 47, wherein said plastic material is a fluorinated plastic material.

51. The process in accordance with claim 47, wherein said plastic material is an elastomer.

52. The process in accordance with claim 38, further comprising the step of applying a layer of plastic material over said metal tube.

53. The process in accordance with claim 52, wherein said plastic material is selected from the group consisting of polyolefins and polyamides.

54. The process in accordance with claim 52, wherein said plastic material is polyethylene.

55. The process in accordance with claim 52, wherein said plastic material is a fluorinated plastic material.

56. The process in accordance with claim 52, further comprising, prior to said step of applying a layer of plastic material over said metal tube, the step of affixing an adhesive to said metal tube.

57. The process in accordance with claim 52, further comprising applying a layer of mesh between said plastic material and said metal tube.

58. The process in accordance with claim 57, wherein said mesh is selected from the group consisting of a textile mesh and a metallic mesh.

* * * * *

UNITED STATES PATENT AND TRADEMARK OFFICE
CERTIFICATE OF CORRECTION

PATENT NO. : 4,999,903

DATED : March 19, 1991

INVENTOR(S) : Georges BUJES

It is certified that error appears in the above-identified patent and that said Letters Patent is hereby corrected as shown below:

At column 1, line 6, change "1985 now abandoned." to ---1985.---.

At column 1, line 10, change "invention" to ---Invention---.

At column 6, line 61, change "v$_3$" to ---V$_3$---.

At column 6, line 67, change "v$_3$" to ---V$_3$---.

At column 7, line 2, insert ---.--- after "obtained".

At column 9, line 4 (claim 13, line 2), insert ---.--- after "material" (second occurrence).

At column 9, line 17 (claim 18, line 3), delete ---to activate--- before "adhesive".

At column 9, line 58 (claim 32, line 2), insert ---.--- after "mesh" (second occurrence).

Signed and Sealed this

Ninth Day of November, 1993

*Attest:*

BRUCE LEHMAN

*Attesting Officer*  *Commissioner of Patents and Trademarks*